United States Patent
Sun et al.

(10) Patent No.: US 6,248,853 B1
(45) Date of Patent: Jun. 19, 2001

(54) METHOD OF PREPARING LIQUID STATE NON-SOLVENT SILICONE RESIN AND RESIN FORMED THEREBY

(75) Inventors: Yong Zhou Sun, Chengdu; Peng Zhao, Shajing; Jian Liu, Taiwan, all of (CN); Chi-Lung Tsai, Taipei shin (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/225,333

(22) Filed: Jan. 5, 1999

(51) Int. Cl.[7] .................................................. C08G 77/06
(52) U.S. Cl. .................................. 528/14; 528/32; 528/33; 528/34; 528/37; 528/43; 556/460; 556/461
(58) Field of Search .................................. 528/14, 32, 33, 528/34, 37, 43; 556/460, 461

(56) References Cited

U.S. PATENT DOCUMENTS 2,915,497 * 12/1959 Clark .
2,975,203 * 3/1961 Bailey .
3,269,983 * 8/1966 Holbrook .
5,273,670 * 12/1993 Endres et al. ....................... 252/49.6

* cited by examiner

*Primary Examiner*—Robert Dawson
*Assistant Examiner*—Jeffrey B. Robertson
(74) *Attorney, Agent, or Firm*—Rosenberg, Klein & Lee

(57) ABSTRACT

A liquid state non-solvent silicone resin obtained from a polycondensation reaction of material (A) dimethyl poly siloxane, material (B) vinyl methyl cyclo siloxane and material (C) diphenyl dihydroxy silane, the reaction being performed at a temperature within about 140~180° C. under the presence of an anionic polymerization catalyzer.

10 Claims, No Drawings

METHOD OF PREPARING LIQUID STATE NON-SOLVENT SILICONE RESIN AND RESIN FORMED THEREBY

BACKGROUND OF THE INVENTION

It is well known that silicone resins can be obtained from organic chloro silane or organic alkoxy silane by means of hydrolysis and polycondensation. Under the presence of a catalyzer or by means of heating, silicone resins can be turned to an insoluble thermosetting product of three-dimensional network structure. When hardened, silicone resins are maintained stable within a wide range of temperature, humidity and frequency. Because silicone resins are oxidation resistant, electric arc resistant, radiation resistant, weather proof, water proof, salty fog resistant and damp proof, they are suitable for use as a base material for making insulative paint, or material for molding or laminating into products for industrial use. Most silicone resins are polycondensed into a three-dimensional network structure. These resins contain a large amount of silanol. When these resins are added with inorganic stuffing such as glass fibers, quartz powder, etc., the material thus obtained can be used for molding into a variety of products. However, because a low molecular compound is released when hubbing, air bubbles exists in the molded product. Therefore, these silicone resins are not suitable for molding transparent products. Dimethyl dichloro silane, diphenyl dichloro silane, phenyl trichloro silane or vinyl methyl dichloro silane can used for making a polycondensed silicone resin that contains vinyl with little silanol. When the resin is heated or induced by peroxide, the double chains of vinyl are opened, therefore the resin is polycondensed into a product of three-dimensional network structure. This material does not release a low molecular compound when molding. However, when this resin is hardened, it tends to break due to the occurrence of a stress resulted from high shrinkage.

SUMMARY OF THE INVENTION

The present invention has been accomplished to provide a liquid state non-solvent silicone resin which eliminates the aforesaid drawbacks. The liquid state non-solvent silicone resin can be made into a transparent hard resin of high strength and low shrinkage by means of polycondensation or molding. The transparent hard resin thus obtained does not break, and has high strength and low shrinkage.

DETAILED DESCRIPTION OF THE PREFERRED EMBODIMENT

A liquid state non-solvent silicone resin made according to the present invention is colorless, transparent, and stable. It is comprised of:

(A) dimethyl poly silioxane

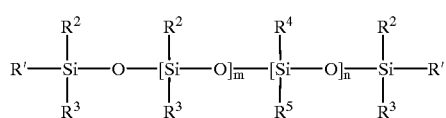

in which, R': methyl or vinyl; $R^2$, $R^3$N $R^4$, $R^5$: methyl, vinyl or phenyl, preferably methyl; "m" and "n": 0~1000.

(B) organic cyclo siloxane

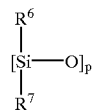

in which, $R^6$ and $R^7$: methyl, vinyl or phenyl, preferably methyl for $R^6$ and phenyl for $R^7$; "p": 3, 4 or 5, preferably 4. (C) diphenyl dihydroxy silane

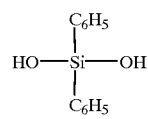

The aforesaid materials (A), (B) and (C) are commonly used materials for organic silicone, and can easily be obtained from the market.

The aforesaid materials (A), (B) and (C) are prepared at 1~5:1:6~1 by mole. Under the presence of anionic polymerization catalyzer through a polycondensation reaction, the molecules of Si-O-Si chain are re-arranged into a balanced status. The anionic polymerization catalyzer can be an alkali metal hydroxide such as KOH, NaOH, LiOH, and their reacted product with silane, such as potassium silane, sodium silane, lithium silane, preferably lithium silane. The amount of the anionic polymerization catalyzer is about 0.005~0.004% by weight of the amount of the silicone resin, preferably about 0.01~0.02%. The polycondensation reaction temperature is within about 140~180° C., preferably within about 150~160° C. The vacuum state is controlled within about 0.0 1MPa~0.095MPa. The reaction time is within 1~3 hours. Reinforcing agent may be added. However, the use of reinforcing agent must match the liquid state non-solvent silicone resin in refractive index. Reinforcing agent can be obtained from white-carbon or MQ resin (silicone resin containing vinyl). White-carbon can be obtained by deposition or gas phase method. White-carbon from hydrophobic gas phase method is preferably accepted. The added amount of reinforcing agent is about 50~120% by weight of the amount of liquid state non-solvent silicone resin, preferably about 80~100% by weight.

EXAMPLE 1

Put 59.2 grams poly dimethyl siloxane of trimethyl silane of viscosity 500cp, 34.4 grams 1.3.5.7-tetra vinyl-1.3.5.7-tetra methyl-cyclo tetra siloxane, 21.6 grams diphenyl dihydroxyl silane and 2.3 grams diphenyl dihydroxy silane catalyzer (KOH content 1%) in a 250 ml three-necked flask which is equipped with a stirrer, a thermometer, an oil-water separator and a condenser, then heat the flask to 150~160° C. when stirring, then release the pressure, and then remove water from the reacted medium. About 1~2 hours after reaction, the material in the flask becomes transparent. When no water or other low molecular substance is released, the reaction is stopped, and a colorless, transparent, viscous silicone resin is thus obtained.

EXAMPLE II

Add 5 grams phenyl silicone oil, 10 grams hydrophobic gas phase catalyzer and a small amount of platinum catalyzer to 10 grams of the aforesaid colorless, transparent, viscous silicone resin, then mix the mixture well, and then treat the mixture by hubbing at about 130° for about 5 minutes, and then heat the molded product at about 200° C. for about 4 hours, and thus a finished product of high strength, high hardness and high transparency is obtained.

What the invention claimed is:

1. A method of preparing a liquid state non-solvent silicone resin comprising the steps of:

(a) establishing a first composition including a dimethyl poly siloxane (I) material having a chemical formulation containing:

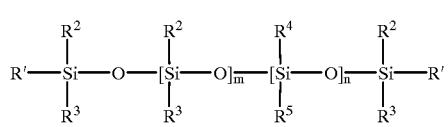

(I)

wherein said R' denotes a component selected from the group consisting of: methyl and vinyl; said $R^2$, $R^3$, $R^4$, and $R^5$ each denote a component selected from the group consisting of: methyl, vinyl, and phenyl; and, said m and n each denote an integer value selected from the range 0 to 1000;

(b) establishing a second composition including an organic ayclo siloxane (II) material having a chemical formulation containing:

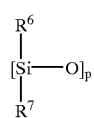

(II)

wherein said $R^6$ and $R^7$ each donote a component selected from the group consisting of: methyl, vinyl, and phenyl; and, said p denotes and integer value selected from the group consisting of: 3, 4, and 5;

(c) establishing a third composition including a diphenyl dihydroxy silane (III) material having a chemical formulation containing:

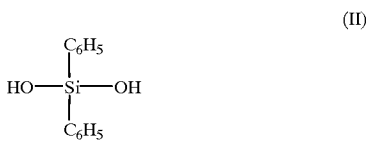

(II)

(d) forming a mixture containing said first, second, and third compositions combined in accordance with a predetermined mole ratio; and, (e) heating said mixture in the presence of an anionic polymerization catalyzer to a reaction temperature within an approximating range of 140 degrees C. to 180 degrees C.

2. The method as recited in claim 1 wherein said, reaction temperature is within an approximating range of 150 degrees C. to 160 degrees C.

3. The method as recited in claim 1 wherein said predetermined mole ratio for combining said first, second, and third compositions in step (d) is within an approximating range of 1~5:1:5~1 by mole.

4. The method as recited in claim 1 wherein said anionic polymerization catalyzer of step (a) includes an alkali metal hydroxide obtained from a composition selected from the group consisting of: XOH, NaOH, LiOR, and reaction products thereof with silane.

5. The method as recited in claim 4 wherein said reaction products with silane include potassium silane, sodium silane, and lithium silane.

6. The method as recited in claim 1 wherein said anionic polymerization catalyzer is present in step (a) in a predetermined amount within an approximating range of 0.005% to 0.004% by weight relative to the total amount of said first, second, and third compositions.

7. The method as recited in claim 1 wherein step (e) includes reducing ambient pressure to a level within an approximating range of 0.01 MPa to 0.095 Xpa for enabling a pressure reduction polycondensation reaction.

8. The method as recited in claim 1 wherein said $R^2$, $R^3$, $R^4$, and $R^3$ components each denote methyl.

9. The method as recited in claim 1 wherein said $R^6$ component denotes methyl, said $R^7$ component denotes phenyl, and said p value equals 4.

10. A liquid state non-solvent silicone resin formed in accordance with the method as recited in claims 1, 2, 3, 4, 5, 6, 7, 8, or 9.

* * * * *